United States Patent

[11] 3,572,834

[72] Inventors  Kurt Herzer
  Karlsruhe, Durlach;
  Wolfgang Mertens, Karlsruhe, Germany
[21] Appl. No. 776,990
[22] Filed Nov. 19, 1968
[45] Patented Mar. 30, 1971
[73] Assignee Kurt Herzer
  Karlsruhe, Germany
[32] Priority Feb. 2, 1968
[33]   Germany
[31]   P 16 80 100.6

[54] ADJUSTABLE HEAD REST FOR VEHICLE SEATS
  7 Claims, 4 Drawing Figs.
[52] U.S. Cl. .................................................. 297/410,
  297/397
[51] Int. Cl. ................................................. A47c 7/36,
  A47c 7/42
[50] Field of Search .......................................... 297/397-
  —410; 248/411, 412

[56]   References Cited
   UNITED STATES PATENTS
1,869,765  8/1932  Mitchell ....................... 297/391
3,063,751  11/1962  Hatch ........................... 297/410
3,159,427  12/1964  Lawson ........................ 297/410

Primary Examiner—Kasmir A. Nunberg
Attorney—Edwin E. Greigg

ABSTRACT: An adjustable headrest wherein the adjusting and locking means are contained within the upholstery and the manually accessible operator lever is disposed in such a manner that it constitutes no safety hazard in an automobile. The device comprises a support rack having a series of depressions along its length; a sleeve surrounding the rack and longitudinally slidable with respect thereto and securing means carried by said sleeve for immobilizing the sleeve with respect to said rack in a desired position by manipulating said accessible lever.

PATENTED MAR 30 1971 3,572,834
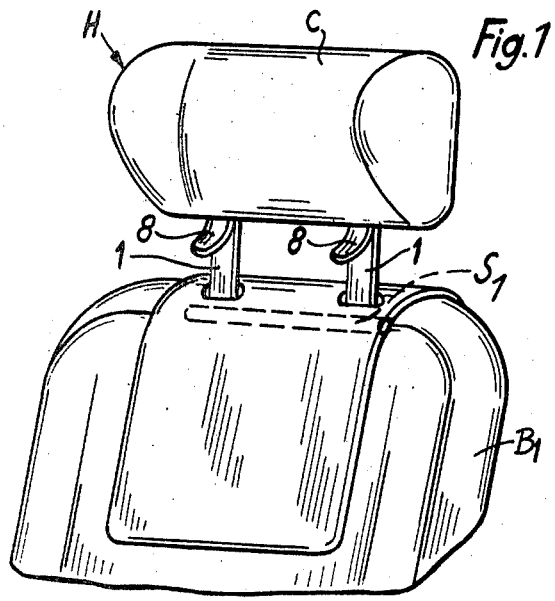
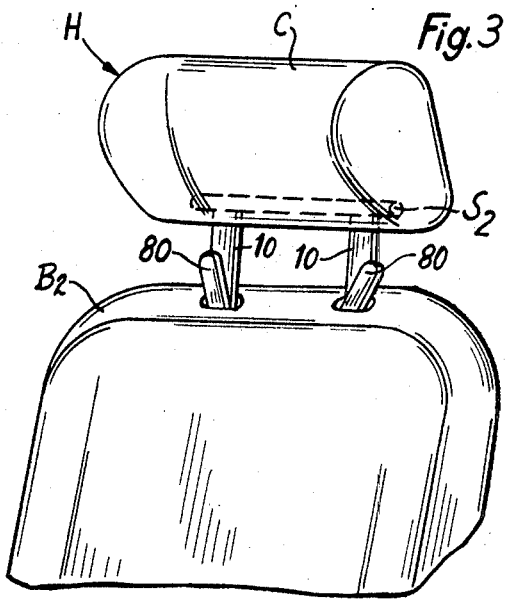
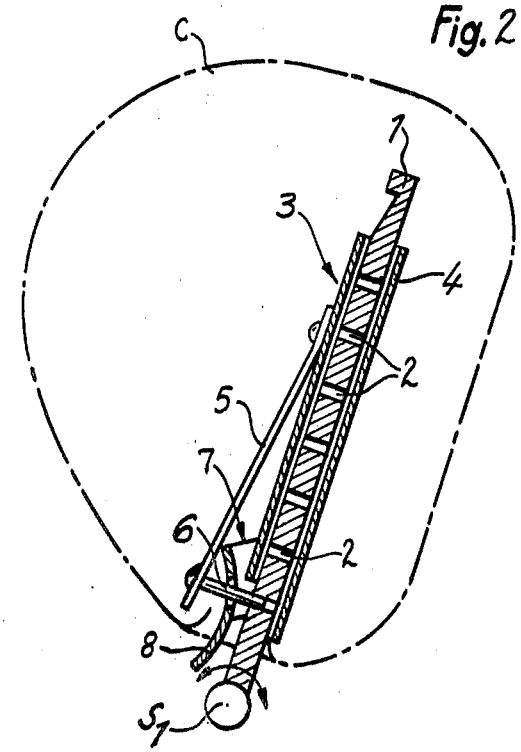
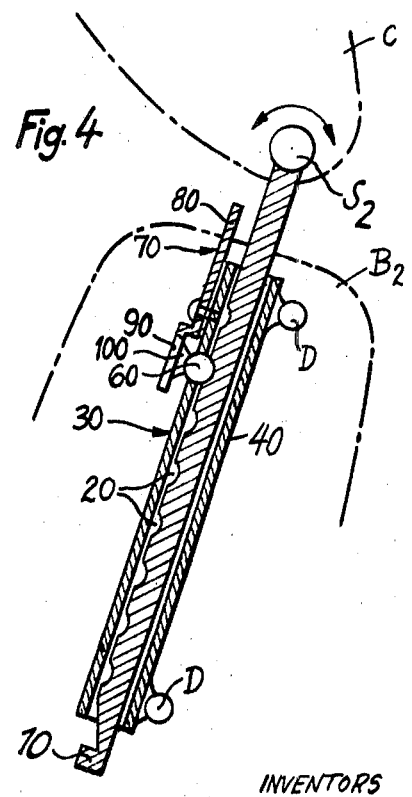
INVENTORS
KURT HERZER
WOLFGANG MERTENS
BY Edwin E. Greigg
ATTORNEY

ADJUSTABLE HEAD REST FOR VEHICLE SEATS

BACKGROUND OF THE INVENTION

Headrests for automobile vehicle seats are widely known in the art. They may form an integral part of the backrest or may be attached thereto by clips or insertable parts.

Headrests of the aforenoted type that are adjustable in a substantially vertical direction and whose angular position may be varied about a substantially horizontal axis are also known. Generally, in order to effect such adjustments, external mechanisms are provided which, due to protruding parts, may cause serious injuries in case of an accident.

An angular adjustment of the headrest by means of a mechanism entirely enclosed within the upholstery has been proposed by applicants in U.S. Ser. No. 708,585, filed Feb. 27, 1968, entitled "Adjustable Headrest for Vehicle Seats." There are also known mechanisms contained entirely within the upholstery for the vertical adjustment of the headrest. Generally, these last-named devices operate with frictional or spring-loaded ratchet elements engaging complemental parts for immobilizing a slidable member. Such internally disposed securing elements for a vertical adjustment, however, have to be loose enough for effecting a manual, vertical displacement of the headrest. A disadvantage of this mechanical solution resides in the fact that the headrest will readily yield in the direction of adjustment to any major shock and therefore it cannot be considered as a safe accessory in an automobile.

OBJECT AND SUMMARY OF THE INVENTION

It is an object of the invention to provide an improved headrest which, on the one hand, may be set into any of a great plurality of height positions by means that do not constitute a safety hazard in an automobile and, on the other hand, may be unyieldingly secured in any desired position thus affording good protection to the occupant of the seat against whiplash or similar injuries in case of an accident.

Briefly stated, in order to achieve the aforenoted object, the headrest is provided with a height adjusting mechanism, the horizontal pivotal axis of which is disposed either in the headrest itself or passes through the backrest rest below the headrest. Basically, there is provided a substantially vertically disposed support rack having a plurality of openings or depressions arranged in a spaced relation in the direction of height adjustment and a securing mechanism slidable relative thereto. The said securing mechanism includes detent means which, when height adjustment of the backrest is desired, is freed by a manually operable release means. The latter is manually accessible but constitutes no safety hazard.

The invention will be better understood and further objects as well as advantages will become more apparent from the ensuing detailed specification of two exemplary embodiments taken in conjunction with the drawings.

BRIEF DESCRIPTION OF THE DRAWINGS

FIG. 1 is a perspective view of a first embodiment of the invention;

FIG. 2 is a sectional elevational view of the embodiment depicted in FIG. 1; FIG. 3 is a perspective view of a second embodiment of the invention; and FIG. 4 is a sectional elevational view of the embodiment shown in FIG. 3.

DESCRIPTION OF A FIRST EMBODIMENT

The embodiment illustrated in FIGS. 1 and 2 is particularly adapted for headrests which are built into the backrest in a permanent manner and in which the horizontal pivotal axis $S_1$ is disposed in the backrest beneath the headrest.

Two spaced parallel headrest support racks 1 are pivotally secured by means, not shown, in a backrest $B_1$ and extend upwardly into the cushion C of the headrest generally indicated at H. Each rack 1 is provided with a plurality of longitudinally spaced apertures 2. To an internal frame (not shown) of the headrest H there is fixedly attached a securing mechanism cooperating with the rack 1 and generally indicated at 3.

The securing of locking mechanism 3 (one associated with each rack 1) comprises a sleeve member 4, at least partially surrounding the rack 1 and slidable with respect thereto. To the sleeve 4 there is secured by one end an elongated leaf spring 5 which at its free end carries a locking pin 6 extending toward the rack 1. Normally, the spring 5 causes locking pin 6 to penetrate into one of the openings 2 in rack 1 and thus hold the latter immobilized with respect to the sleeve 4. To sleeve 4 there is further secured a release member generally indicated at 7 having a curved actuating lever 8, one end of which extends out of the cushion C and is manually accessible. Be depressing the lever 8, the release member 7 executes a rocking motion whereby a force is exerted on spring 5 which opposes and overcomes the force of the spring itself. As a result, the spring 5 will be displaced clockwise and thus the locking pin 6 will be withdrawn from the opening 2. By virtue of this operation the rack 1 is freed with respect to the sleeve 4 and thus a height adjustment of the headrest may take place. When the headrest is set in the desired height position, the lever 8 is released, whereupon the spring 5 moves counterclockwise causing the locking pin 6 to penetrate into that opening 2 which, in the new height position of the headrest, is in alignment with the locking pin 6.

DESCRIPTION OF A SECOND EMBODIMENT

The embodiment shown in FIGS. 3 and 4 is particularly adapted for headrests which may be inserted into the backrest and which may be angularly adjusted about an axis passing through the headrest.

One end of two spaced parallel support racks 10 are pivotally secured to a shaft $S_2$ extending horizontally in the lower portion of a headrest H inside the cushion C thereof. The racks 10 extend downwardly into a backrest $B_2$. Each rack 10 is provided with a plurality of longitudinally spaced depressions 20.

To the frame (not shown) of backrest $B_2$ there is attached at D a securing mechanism generally indicated at 30.

The securing or locking mechanism 30 (one associated with each rack 10) comprises a sleeve member 40, at least partially surrounding the rack 10 and slidable with respect thereto. Sleeve 40 holds a detent ball 60, the surface of which protrudes beyond either wall face of sleeve 40. One portion of the ball 60 is adapted to nest in one of the depressions 20, while a diametrically opposed portion is cooperating with a locking lever pivotally secured to sleeve 40 and generally indicated at 70. The locking lever 70 comprises an arm 80 which extends upwardly beyond the backrest $B_2$ and is manually accessible. The lever 70 is further formed of an arm 90 to which there is fixedly secured a wedge element 100. Normally, the release lever 70 is set in such a manner that the wedge element 100 is in engagement with the detent ball 60 locking the same securely in a nested position in one of the depressions 20.

If height adjustment of the headrest is desired, arms 80 are manually engaged and caused to pivot. As a result, the wedge 100 clears the detent ball 60 which now sits only loosely in the depression 20. As a result, the rack 10 may be caused to slide with respect to sleeve member 40 and thus a height adjustment of the headrest may be effected. When the desired adjustment is obtained, each release lever 70 is urged back into its earlier position by exerting an adequate manual force on arm 80. As a result, the wedge 100 of the release lever 70 again engages the detent ball 60 which is, as a result, securely held in that depression 20 which, in the new height position, is in alignment with the detent ball 60.

It is to be understood that instead of distinct spaced openings or depressions, the racks 1, 10 may be provided with any desired type of surface adapted to come into a frictional engagement with the detent mechanism upon termination of the height adjusting operation.

We claim:
1. In a headrest of the type attached to the backrest of vehicle seats and adjustable to assume a desired height position, the improvement comprising,
   A. a support rack for holding said headrest on said backrest and
   B. a securing mechanism for positively locking said headrest with respect to said backrest in any of a plurality of height positions, said securing mechanism including
      1. a sleeve, at least partially surrounding said support rack and adapted to slide with respect thereto,
      2. a detent means carried by said sleeve for interlockingly engaging said support rack to positively lock the latter with respect to said sleeve against any displacement,
      3. release means carried by said sleeve and operatively connected with said detent means and
      4. manually accessible means forming part of said release means to effect, when manually actuated, disengagement of said detent means from said support rack permitting the latter to slide with respect to said sleeve, said manually accessible means being so located as not to constitute a safety hazard upon appearance of sudden acceleration and deceleration forces.

2. The improvement as defined in claim 1 wherein said support rack is pivotally held in said backrest and extends therefrom into said headrest, said securing mechanism is fixedly held within said headrest.

3. The improvement as defined in claim 1 wherein said support rack is pivotally held in said headrest and extends therefrom into said backrest, said securing mechanism is fixedly held within said backrest.

4. The improvement as defined in claim 1 wherein said support rack is provided with longitudinally spaced openings, said detent means includes a locking pin urged into one of said openings by spring means, said release means includes a member movably attached to said sleeve and having a manually accessible lever, said member is connected to said pin and is adapted, upon manual actuation of said lever, to withdraw said pin from said opening against the force of said spring means.

5. The improvement as defined in claim 4 wherein said spring means is a leaf spring, one end of which is secured to said sleeve and the other end of which carries said locking pin.

6. The improvement as defined in claim 1 wherein said support rack is provided with longitudinally spaced depressions, said detent means includes a detent ball held by said sleeve, said release means includes a lever movably secured to said sleeve, said lever is adapted to assume a first position in which it clamps said detent ball into one of said depressions, said lever is adapted to assume a second position in which it permits said detent ball to clear said depression, said lever is further adapted to be manually engaged for displacing it from one of said positions into the other.

7. The improvement as defined in claim 6 wherein said lever is pivotally secured to said sleeve and is formed of a first arm having a wedge which is in engagement with said detent ball when said lever is in said first position, said wedge is disengaged from said detent ball when said lever is in said second position, said lever is further formed of a second arm at least the end portion of which is manually engageable.